United States Patent
Volfson

(10) Patent No.: US 9,602,730 B2
(45) Date of Patent: *Mar. 21, 2017

(54) MOUNTABLE, THERMAL SITUATIONAL-AWARENESS ACCESSORY FOR USE WITH OPTICAL DEVICES

(71) Applicant: Leo Volfson, San Diego, CA (US)

(72) Inventor: Leo Volfson, San Diego, CA (US)

(73) Assignee: Torrey Pines Logic, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/986,450

(22) Filed: Dec. 31, 2015

(65) Prior Publication Data

US 2016/0191761 A1 Jun. 30, 2016

Related U.S. Application Data

(60) Provisional application No. 62/098,585, filed on Dec. 31, 2014.

(51) Int. Cl.
| | |
|---|---|
| G06F 19/00 | (2011.01) |
| H04N 5/232 | (2006.01) |
| H04N 5/225 | (2006.01) |
| H04N 5/30 | (2006.01) |

(52) U.S. Cl.
CPC ....... *H04N 5/23293* (2013.01); *H04N 5/2252* (2013.01); *H04N 5/30* (2013.01)

(58) Field of Classification Search
CPC ....... H01L 2924/00; H01L 2224/48227; H01L 2224/48091; H01L 2924/00014; G06K 19/07732; G06K 19/07739; G06K 7/0021; G06K 13/08; G06K 19/077; G06K 19/07743; G06K 19/07745; G06K 7/0047; H04N 5/2252; H04N 5/2253; H04N 5/23293; H04N 5/23296; H04N 5/33
USPC .......................................... 235/488, 492, 441
See application file for complete search history.

(56) References Cited

U.S. PATENT DOCUMENTS

| | | | | |
|---|---|---|---|---|
| 9,038,305 | B2 * | 5/2015 | Volfson | F16M 13/02 42/90 |
| 2006/0187558 | A1 * | 8/2006 | Kassenaar | G02B 7/026 359/811 |
| 2007/0211162 | A1 * | 9/2007 | Kaihara | G02B 27/0006 348/335 |
| 2008/0259200 | A1 * | 10/2008 | Matsumoto | B08B 7/02 348/340 |
| 2009/0129034 | A1 * | 5/2009 | Cheng | H01L 27/14618 361/740 |
| 2012/0044386 | A1 * | 2/2012 | Keitzer | H04N 5/2254 348/239 |
| 2012/0195587 | A1 * | 8/2012 | Hasuda | G03B 17/565 396/532 |

(Continued)

*Primary Examiner* — Thien M Le
(74) *Attorney, Agent, or Firm* — Fish & Richardson P.C.

(57) ABSTRACT

A situational-awareness accessory comprises a housing including a control board, a user display, and a visual sensor for receiving electromagnetic radiation that is invisible to the human eye from a wide-angle, optical field-of-view in front of the visual sensor. The control board converts the received electromagnetic radiation into visual display data and initiates display of the visual display data on the user display. A quick-detach accessory base mount coupled with the housing permits attachment of the housing to an accessory rail.

18 Claims, 13 Drawing Sheets

(56) References Cited

U.S. PATENT DOCUMENTS

2012/0201531 A1* 8/2012 Hasuda ................ G03B 17/14
396/531

* cited by examiner

MOUNTABLE, THERMAL SITUATIONAL-AWARENESS ACCESSORY FOR USE WITH OPTICAL DEVICES

CROSS-REFERENCE TO RELATED APPLICATIONS

This application is a Non-Provisional Patent Application of and claims the benefit of priority to U.S. Provisional Application Ser. No. 62/098,585, filed on Dec. 31, 2014, the contents of which are hereby incorporated by reference.

BACKGROUND

Currently when using an optical device (e.g., a firearm scope, spotting scope, binocular, telescope, etc.) with a relatively narrow field-of-view (FOV), and particularly an optical device that is not designed to operate in a no-light (or low-light) situation, it can be extremely difficult to differentiate and engage a desired target in a no-light situation due to a lack of available ambient light and the relatively narrow FOV offered by the optical device. Even in situations where the optical device can be switched to a no-light type optical device (e.g., a night vision scope) and an attempt is made to use the optical device, a failure of a desired task can occur due to an inability to find and engage a target and assess a tactical situation due to the optical device's narrow FOV.

SUMMARY

The present disclosure describes a situational-awareness accessory for use with optical devices.

In an implementation, the situational-awareness accessory comprises a housing including a control board, a user display, and a visual sensor for receiving electromagnetic radiation that is invisible to the human eye from a wide-angle, optical field-of-view (FOV) in front of the visual sensor; a control board for converting the received electromagnetic radiation into visual display data and to initiate display of the visual display data on the user display; a quick-detach accessory base mount coupled with the housing and permitting attachment of the housing to an accessory rail, the quick-detach accessory base mount including: a rail clamp carried to selectively clamp the base mount to the accessory rail; a mounting arm coupled with a pivot shaft threaded to hold a preload screw opposite the mounting arm and the rail clamp, the mounting arm configured to rotate relative to the base mount between a clamped and an unclamped position associated with the rail clamp, the rotation of the mounting arm causing the rail clamp to clamp and unclamp the base mount to the accessory rail, respectively; and an interlock configured to selectively restrict rotation of the mounting arm between the clamped and unclamped positions.

In another implementation, the situational-awareness accessory comprises a housing including a control board, a user display, and a visual sensor for receiving electromagnetic radiation that is invisible to the human eye from a wide-angle, optical field-of-view (FOV) in front of the visual sensor; a control board for converting the received electromagnetic radiation into visual display data and to initiate display of the visual display data on the user display; a quick-detach accessory base mount coupled with the housing and permitting attachment of the housing to an accessory rail, the quick-detach accessory base mount including: a rail clamp carried to selectively clamp the base mount to the accessory rail; and a rotatable mounting arm coupled with a pivot shaft passing through the rail clamp, the pivot shaft threaded to hold a preload screw opposite the mounting arm and the rail clamp, the preload screw used to configure a clamping force of the rail clamp to the accessory rail, and the preload screw secured to the mounting arm in a particular position using a preload grub screw.

The foregoing and other implementations can each optionally include one or more of the following features, alone or in combination:

A first aspect, combinable with the general implementation, wherein electromagnetic radiation receivable by the visual sensor includes at least one of ultraviolet (UV), infrared (IR), or X-ray.

A second aspect, combinable with any of the previous aspects, comprising an objective lens to provide at least one of protection or functionality enhancement to the visual sensor.

A third aspect, combinable with any of the previous aspects, wherein the functionality enhancement includes one or more of providing a wider FOV, magnification, and filtering of one or more wavelengths of electromagnetic radiation.

A fourth aspect, combinable with any of the previous aspects, wherein the visual sensor is configured to be interchangeable within the housing.

A fifth aspect, combinable with any of the previous aspects, comprising an aiming-type indicator displayed on the user display.

A sixth aspect, combinable with any of the previous aspects, comprising optical or digital zoom functionality provided with the visual sensor to provide a zoomed image on the user display.

A seventh aspect, combinable with any of the previous aspects, wherein the control board provides connectivity functionality with an external computing device.

An eighth aspect, combinable with any of the previous aspects, wherein the external computing device can configure the situational-awareness accessory, record data received from the situational-awareness accessory, and supply data to the situational-awareness accessory for display on the user display.

A ninth aspect, combinable with any of the previous aspects, wherein the control board comprises a first control board and a second control board joined by a flexible data connection and folded back-to-back within the housing.

One method of use includes: associating a situational-awareness accessory with an optical device, the situational-awareness accessory including a user display and a visual sensor; activating the situational-awareness accessory to receive electromagnetic radiation that is invisible to the human eye from a wide-angle, optical field-of-view (FOV) in front of a visual sensor; adjusting settings for the situational-awareness accessory on the user display; viewing the user display of the situational-awareness accessory to make a situational awareness evaluation of an immediate area in front of the situational-awareness accessory, the user display displaying the received electromagnetic radiation converted into visual display data; and using the optical device to engage a target based on the situational awareness evaluation.

The foregoing implementation can optionally include one or more of the following features, alone or in combination:

A first aspect, combinable with the general implementation, wherein associating the situational-awareness accessory with the optical device includes use of a quick-detach accessory base mount configured as part of the situational-awareness accessory, the quick-detach accessory base mount including: a rail clamp carried to selectively clamp the base mount to the accessory rail; a mounting arm coupled with a pivot shaft threaded to hold a preload screw opposite the mounting arm and the rail clamp, the mounting arm configured to rotate relative to the base mount between a clamped and an unclamped position associated with the rail clamp, the rotation of the mounting arm causing the rail clamp to clamp and unclamp the base mount to the accessory rail, respectively; and an interlock configured to selectively restrict rotation of the mounting arm between the clamped and an unclamped position.

A second aspect, combinable with any of the previous aspects, comprising interchanging the visual sensor in the situational-awareness accessory depending upon which wavelength of electromagnetic radiation desired to be used to make the situational awareness evaluation.

A third aspect, combinable with any of the previous aspects, comprising connecting the situational-awareness accessory to an external computing device, wherein the external computing device can be used to configure the situational-awareness accessory, record data received from the situational-awareness accessory, and to supply data to the situational-awareness accessory for display on the user display.

Other implementations of this aspect can include corresponding computer systems, apparatuses, and computer programs recorded on one or more computer-readable media/storage devices, each configured to perform one or more actions or methods associated with the described situational-awareness accessory for use with optical devices. A system of one or more computers can be configured to perform particular operations or actions by virtue of having software, firmware, hardware, or a combination of software, firmware, or hardware installed on the system that in operation causes the system to perform the actions. One or more computer programs can be configured to perform particular operations or actions by virtue of including instructions that, when executed by data processing apparatus, cause the apparatus to perform the actions.

The subject matter described in this specification can be implemented in particular implementations so as to realize one or more of the following advantages. First, the use of the situational-awareness accessory in conjunction with a daylight-type optical device can extend the usefulness of the daylight-type optical device into situations where ambient light is naturally fading (e.g., at dusk/sunset) or when entering a no-light (or low-light) environment (e.g., a building with no lights, moonless/cloudy night, in woods/jungle, etc.). For example, the situational-awareness accessory can be used to provide a thermal (or other invisible-light), wide-angle, situational-awareness field-of-view (FOV) ("situational-awareness") of an area in front of a user to allow the user to quickly and accurately spot a target and orient a normally degraded functionality daylight-type optical device toward the target in a no-light environment. This increase in reaction time can result in proper and effective target engagement and enhance overall safety for the situational-awareness accessory user. When using a low-light optical device, the situational-awareness accessory can still provide situational-awareness to the user with the above-mentioned provided benefits. Second, the situational-awareness accessory can itself be used to provide an overall situational awareness for the user of a daylight- or no-light-type optical device. For example, a user of a firearm with an attached optical device and situational-awareness accessory can sweep the firearm across a particular area in a no-light environment and use the situational-awareness accessory to generate a quick assessment of a number of potential targets, differentiate friend vs. foe, determine a tactical situation, and the like. Third, the situational-awareness accessory can provide greater confidence/confirmation of the identity of a target when used in conjunction with a daylight-type (or even no-light-type) optical device. For example, the situational-awareness accessory can be used to verify that a target is in actuality a target desired to be engaged. As a particular example, a hunter can confirm at dusk that an object seen in the daylight-type optical device is actually an animal being hunted as opposed to a human hunter concealed in vegetation. At night, the situational-awareness accessory could be used to confirm that a group of people are in fact police officers by the way they are moving as opposed to sought-after perpetrators trying to escape police on foot. Fourth, the thermal nature of an example situational-awareness accessory can also be used to peer through smoke, haze, fog, and/or other obscurants in the air. For example, in a situation where law enforcement has a problem with criminals in a specific house/building, smoke grenades are often thrown into the building and law enforcement then enters. Standard night vision (no-light) or optical scopes are useless in this environment due to the smoke in the air. However, in the thermal band, law enforcement can see through the generated smoke and make out people, furniture, etc. Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
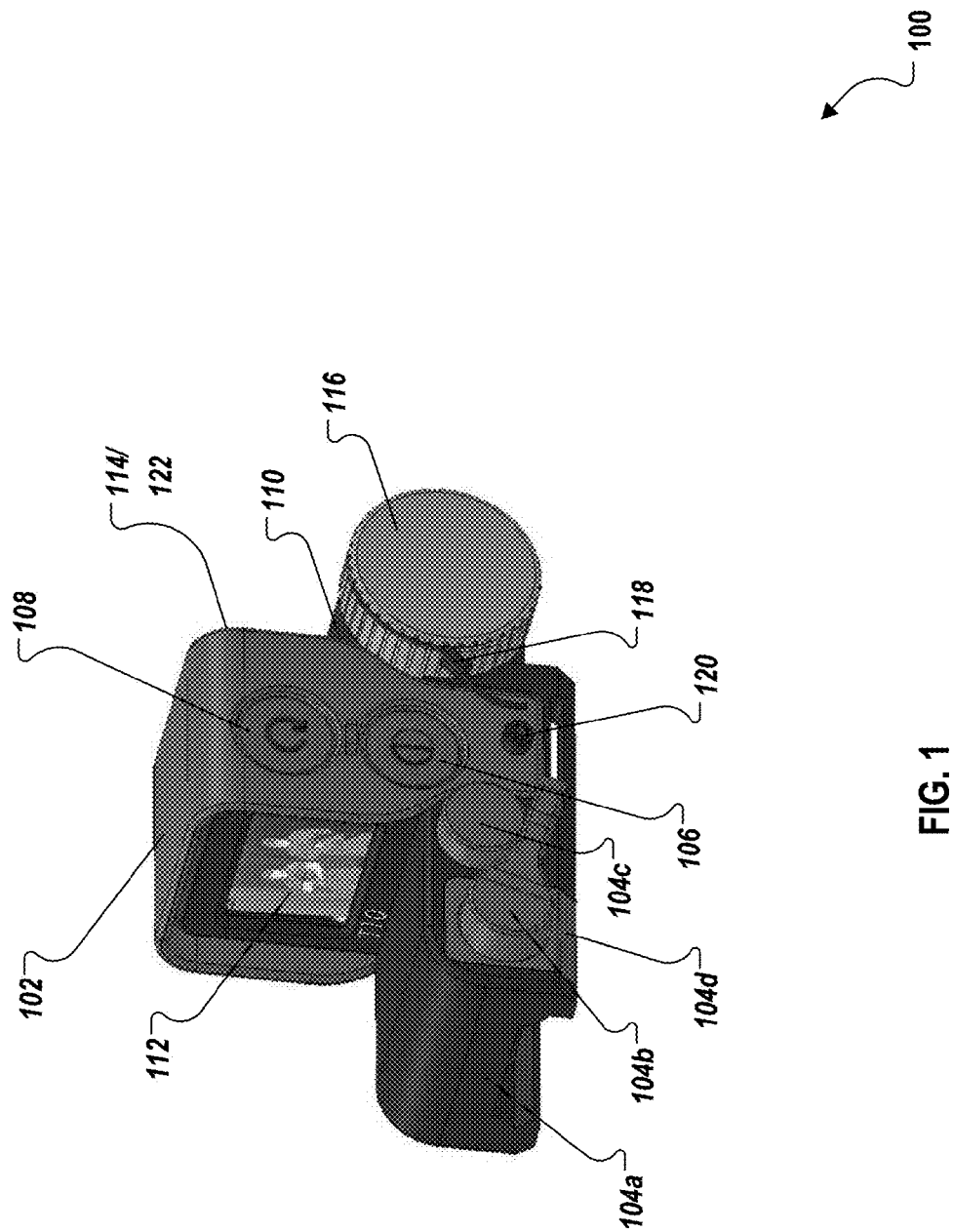
FIG. 1 illustrates a right-side perspective view of a situational-awareness accessory for use with optical devices, according to an implementation.

The present disclosure describes a situational-awareness accessory for use with optical devices.

The following detailed description is presented to enable any person skilled in the art to make, use, and/or practice the disclosed subject matter and is provided in the context of one or more particular implementations. Various modifications to the disclosed implementations will be readily apparent to those skilled in the art, and the general principles defined herein may be applied to other implementations and applications without departing from the scope of the disclosure. Thus, the present disclosure is not intended to be limited to the described and/or illustrated implementations but is to be accorded the widest scope consistent with the principles and features disclosed herein.

Currently when using an optical device (e.g., a firearm scope, spotting scope, binocular, telescope, etc.) with a relatively narrow field-of-view (FOV) (e.g., 3-10 degrees), and particularly an optical device that is not designed to operate in a no-light situation, it can be extremely difficult to differentiate and engage a desired target in a no-light situation due to a lack of available ambient light and the relatively narrow FOV offered by the optical device. Even in situations where the optical device can be switched to a no-light-type optical device (e.g., a night vision scope) and an attempt is made to use the optical device, a failure of a desired task can occur due to an inability to find and engage a target and assess a tactical situation due to the optical device's narrow FOV.

At a high level, what is described is a situational-awareness accessory for use with optical devices (both daylight and no-light types). In typical implementations, the situational-awareness accessory is a thermal version of a sighting system similar to a standard red-dot-type display, but all digital in operating principle. As will be appreciated by those of ordinary skill in the art, the situational-awareness accessory could also be made to operate in other wavelengths (e.g., switchable between single wavelengths or concurrent detection of multiple wavelengths) of electromagnetic radiation (e.g., visible spectrum, ultraviolet (UV), X-ray, and/or other wavelengths). The use of the situational-awareness accessory in conjunction with a daylight-type optical device can extend the usefulness of the daylight-type optical device into situations where ambient light is naturally fading (e.g., at dusk/sunset)/imperceptible or when entering a no-light environment (e.g., a building, etc.). For example, the situational-awareness accessory can be used to provide a thermal, wide-angle (e.g., 25-50 degrees), situational-awareness field-of-view (FOV) ("situational-awareness") of an area in front of a user to allow the user to quickly and accurately spot a target in the available displayed wide FOV and orient a normally degraded functionality daylight-type optical device toward the target in a no-light environment. This increase in reaction time can result in proper and effective target engagement and enhance overall safety for the situational-awareness accessory user. When using a no-light optical device, the situational-awareness accessory can still provide situational-awareness to the user with the above-mentioned provided benefits. The situational-awareness accessory can itself be used to provide an overall situational awareness for the user of a daylight- or no-light-type optical device. For example, a user of a firearm with an attached optical device and situational-awareness accessory can sweep the firearm across a particular area in a no-light environment and use the situational-awareness accessory to generate a quick assessment of a number of potential targets, differentiate friend vs. foe, determine a tactical situation, and the like. The situational-awareness accessory can also provide greater confidence/confirmation of the identity of a target when used in conjunction with a daylight-type (or even no-light-type) optical device. For example, the situational-awareness accessory can be used to verify that a target is in actuality a target desired to be engaged. As a particular example, a hunter can confirm at dusk that an object seen in the daylight-type optical device is actually an animal being hunted as opposed to a human hunter concealed in vegetation. At night, the situational-awareness accessory could be used to confirm that a group of people are in fact police officers by the way they are moving as opposed to sought-after perpetrators trying to escape police on foot. The thermal nature of an example situational-awareness accessory can also be used to peer through smoke, haze, fog, and/or other obscurants in the air. For example, in a situation where law enforcement has a problem with criminals in a specific house/building, smoke grenades are often thrown into the building and law enforcement then enters. Standard night vision (no-light) or optical scopes are useless in this environment due to the smoke in the air. However, in the thermal band, law enforcement can see through the generated smoke and make out people, furniture, etc.

FIG. 1 illustrates a right-side perspective view 100 of a situational-awareness accessory for use with optical devices, according to an implementation. The situational-awareness accessory includes a housing 102, accessory rail mounting system (collectively body 104a, mounting arm 104b, interlock 104c, rail clamp 104d—and other related components), power button 108, adjustment button 106, battery compartment 110, removable battery-compartment cap 116, battery-compartment cap retainer 118, battery-compartment cap retainer anchor 120, user display 112, and visual sensor 114 (not illustrated, refer to FIG. 3 for an illustration).

The housing 102 can be made of one or more metals, plastics, rubbers, composite materials, or other suitable materials. In the illustrated implementation of the situational-awareness accessory, the housing forms a type of hood over the user display 112 and visual sensor 114 to offer protection from impact. In some implementations, the housing 102 can be configured to be attached to the body 104a (e.g., by adhesives, mechanical fasteners, welds, etc.). In other implementations, the housing can be integrally machined as part of the body 104a. The housing 102 is configured to permit installation of an internal control board (e.g., user display 112, visual sensor 114, control board—e.g., see FIGS. 9-11, etc.). In some implementations, the battery compartment 110 can be attached to the housing 102 and/or the body 104a. In some implementations, the housing can be configured to accept O-rings, plastic/glass display/sensor covers, and other types of sealing components to make the housing 102 waterproof to protect internally mounted components (e.g., the internal control board and related components).

In some implementations, the accessory rail mounting system (104a-104c) includes a cam-supported rail clamp moveable to selectively clamp the situational-awareness accessory to an accessory rail ("rail"), such as that commonly found on a firearm, tripod, fence, building, vehicle, etc. Examples of a rail can include a WEAVER or PICATINNY (also known as a MIL-STD-1913, STANAG 2324, or "tactical" rail). An example of the accessory rail mounting system is described in co-pending U.S. patent application Ser. No. 13/923,044, which is hereby incorporated by reference. As will be appreciated by those of ordinary skill in the art, the accessory rail mounting system can vary in form, implementation, and design. The design of the accessory rail mounting system, as long as capable of attaching the situational-awareness accessory to a rail, is not meant to limit the other described components of the situational-awareness accessory in any manner.

The power button 108 is designed to power the situational-awareness accessory on and off. In some implementations, the power button 108 can have additional functionality, such as multiple clicks for a timed ON/OFF mode, press-and-hold to change operational modes, etc. In some implementations, the power button 108 can be used in conjunction with the adjustment button to provide additional adjustment functionality. For example, when adjusting the situational-awareness accessory user display 112/functions, a momentary press of the power button may allow for adjustments, while a longer/more purposeful press of the power button will provide power functionality. As will be appreciated by those of ordinary skill in the art, the power button 108 can vary in form, implementation, and design, and these variances are not meant to limit the situational-awareness accessory in any manner.

The adjustment button 106 is designed to provide adjustment functionality for features/functions of the situational-awareness accessory. In typical implementations, adjustment button 106 is designed to simply toggle between color modes (e.g., white hot, black hot). In other implementations, the adjustment button 106 can be used for other adjustment functionality. For example, the adjustment button 106 can be configured to adjust user display 112 brightness, operating modes, aiming reticle/dots, optical path in relation to a separate optical device, user display 112 frame rate, display colors/negative color mode (e.g., white hot, black hot), display temperature settings, wider/taller images, day/no-light modes, zooming, enabling/disabling a link to an external smart device, and/or the like. In some implementations, the adjustment button 106 can operate in a single button adjustment manner—where the single adjustment button 106 is used to perform all adjustments (e.g., through a series of short and longer presses, holds, etc.). In other implementations, the adjustment button 106 can be used in conjunction with the power button 108 as described above and/or some other attached adjustment mechanism (e.g., connected to a built-in USB port—not illustrated). In some other implementations, the user display 112 can have touch sensitivity to allow adjustment in conjunction with the adjustment button 106 and/or the power button 108. As will be appreciated by those of ordinary skill in the art, the adjustment button 106 can vary in form, implementation, and design, and these variances are not meant to limit the situational-awareness accessory in any manner. As such, other configurations are considered to be within the scope of this disclosure. For example, the adjustment button (and related functionality) could be configured to be multiple buttons, switches (e.g., Mylar, sliding, toggle, etc.), a touch-sensitive surface, etc. In other implementations, the adjustment functionality can also be integrated into an application executing on a linked (e.g., by situational-awareness accessory-integrated WIFI, BLUETOOTH, or other technology, etc. on the internal control board) external smart device (e.g., a smart phone, tablet computer, etc.).

In some implementations, the power button 108 and/or the adjustment button can be of a different format/mechanism. For example, the power button can be configured as a different type of power control mechanism consistent with this disclosure (e.g., an ON/OFF switch, an internal motion-detecting sensor that automatically powers the situational-awareness accessory ON when movement is detected and powers the situational-awareness accessory OFF after a period of inactivity, etc.). Similarly, the illustrated adjustment button could instead be configured as a dial, toggle switch, or other type of adjustment mechanism consistent with this disclosure. In some alternative implementations, the power button 108 and adjustment button 106 can be combined into a single control mechanism. In other implementations, the power button 108 and/or the adjustment button 106 can be omitted from the situational-awareness accessory. In these implementations, a touch-sensitive display, a linked smart device, and/or external power control/adjustment mechanism can be used to make power control settings/adjustments for the situational-awareness accessory. Additionally, in some other implementations, more than one power button 108 and/or adjustment button 106 (or other mechanisms) can be configured as part of the situational-awareness accessory (e.g., each to perform different functions or to work in conjunction with each other).

Battery compartment 110 typically holds a battery to provide power to the situational-awareness accessory. In some implementations, the battery can be either rechargeable or non-rechargeable (such as a 123A, CR2032, AA, AAA, etc.) installed under a removable battery-compartment cap 116 retained to the situational-awareness accessory by a battery-compartment cap retainer 118 (e.g., a loop of wire wrapped around the removable battery-compartment cap 116) and secured to the situational-awareness accessory by a battery-compartment cap retainer anchor 120 (e.g., a screw head with a hole to accommodate the attachment of the battery-compartment cap retainer 118). Although not illustrated in FIGS. 1-8, battery-compartment cap retainer 118 is typically attached to battery-compartment cap retainer anchor 120. In some implementations, the removable battery-compartment cap 116 can be a pop-off, screw-type, etc. In typical implementations, the removable battery-compartment cap 116 (or battery compartment 110) is configured with one or more O-rings or other seals to provide a waterproof compartment for a battery.

In some implementations, the situational-awareness accessory can be connected to an external power supply (using one or more connectors (not illustrated)). For example, various connectors can include USB (and variants), SD/microSD memory card slots, CF memory card slot, FIREWIRE, LIGHTNING, RCA, 3.5 mm audio, HDMI, component, and/or other types of connectors consistent with this disclosure. In some implementations, connectors can allow the situational-awareness accessory to be attached to an external control assembly, external power supplies, computing equipment (such as a smart device), memory storage devices, and/or instruments/sensors, etc. to either receive, record, etc. data from the situational-awareness accessory or to provide additional data to the situational-awareness accessory for configuration, display, etc.

In implementations enabling a connection to an external power supply, the external power supply could either power the situational-awareness accessory and/or recharge a battery associated with the battery compartment 110 (e.g., if a rechargeable battery). The internal control board (see FIGS. 9 and 10, power supply management 904, and related discussion) can be configured to determine whether a battery is a rechargeable battery and control recharging functionality if appropriate power is supplied. In some implementations, the situational-awareness accessory can have an indicator (e.g., LED, audio chirp, user display 112 indicator, and/or other visual/audio indicator) that a battery is (or is about to be) discharged. In some implementations, the situational-awareness accessory can transmit data to a smart device to display a message to a user that a battery is discharged and needs replacement/recharging.

User display 112 is used to display visual data received by the visual sensor 114 and processed by the internal control board for display to a user. In some implementations, and as described above, data can be introduced for display on the user display 112 from received external data (e.g., an externally linked smart device and/or other device). In typical implementations, the user display 112 can be a liquid crystal display (LCD), organic light emitting diode (OLED) display, or other similar/suitable display. In some implementations, the user display 112 can be projected into the illustrated position (e.g., by using an LCD and a mirror).

In some implementations, the situational-awareness accessory user display 112 can have a visually displayed reticle, dot, and/or aiming-type indicator ("reticle"). Whether or not a reticle is displayed can be regulated by laws, regulations, etc. In some implementations, the situational-awareness accessory user display 112 can be devoid of a reticle in order to be in compliance with laws and/or regulations. In implementations with a reticle, the reticle types/patterns can be pre-programmed and/or uploaded into the situational-awareness accessory using an above-described connector, WIFI connection, etc. Reticles can also be aligned ("zeroed") with a reticle on an optical scope or other optical device to allow for even greater versatility (e.g., using the adjustment button 106 functionality or perhaps an application executing on a smart device to move the displayed reticle). For example, the situational-awareness accessory could be used when no-light conditions make aiming with an optical scope difficult. The situational-awareness accessory could be used to place the optical scope "in the ballpark" using the displayed situational-awareness accessory reticle and then the user could switch to the optical scope to find and engage a target using the optical scope reticle. Note that the situational-awareness accessory can be used in a similar manner to place an optical scope "in the ballpark" without a displayed reticle.

In some implementations, the situational-awareness accessory user display 112 frame rate for display image refresh can also be restricted. For example, an 8 Hz refresh rate may be exportable to different countries, but a 9 Hz+ refresh rate may not. Note that the exportability, legality, etc. may also be influenced by the inclusion of the above-mentioned reticles in combination with varied refresh rates.

In typical implementations, the visual sensor 114 is designed to collect non-visible light to allow processing by the internal control board and display on the user display 112. For example, in some implementations, the visual sensor 114 can be a LEPTON brand thermal imager visual sensor such as that produced by FLIR, Inc. (or equivalent type of visual sensor). In some implementations, an objective lens 122 (not illustrated in FIG. 1—see FIG. 3) can be used to cover, protect, and/or enhance the functionality of the visual sensor 114. For example, the objective lens 122 can be interchangeable depending on the purposes of the situational-awareness accessory (e.g., wider FOV, higher needed magnification, type of visual data desired, etc.). For example, in some implementations, the objective lens 122 can be configured of a material transparent to infrared (IR) radiation such as in thermal imaging systems. In some implementations, the objective lens 122 can be configured of Germanium (Ge), quartz, AMTIER, barium fluoride, calcium fluoride, sodium chloride, CLEARTRAN, fused silica, silicon, polyethylene, IR transparent ceramics, and/or any other type of substance transparent to infrared electromagnetic radiation. In some implementations, the objective lens 122 can be made of a substance transparent to both optical and IR radiation wavelengths (e.g., quartz, polyethylene, etc.). In some implementations, the objective lens 122 and visual sensor 114 associated with the situational-awareness accessory can be removed and replaced within the situational-awareness accessory housing to change overall functionality without needing a separate situational-awareness accessory unit. In some implementations, an objective lens 122 can be configured as part of the housing 102, an attachment to the housing 102, or be an integral part of the visual sensor 114 (meaning that there may not be a separate objective lens—in which case, a transparent window can be used to protect the visual sensor 114 in some implementations). In some implementations, the visual sensor 114 can be zoomed (optically and/or digitally) to magnify a received image for display on the user display 112.

In some implementations, the housing 102 can be configured with a built-in microphone (not illustrated) (e.g., a small opening in the housing 102) to receive audio data to be recorded (e.g., on a connected memory card (see above regarding connectors) and/or internal memory), transmitted (using a wireless or wired connection to a receiving device), or monitored (e.g., using a plugged in headset—see above regarding connectors). In other implementations, the configured microphone can also provide an auxiliary connector (see above regarding connectors) to attach a separate higher sensitivity/directional microphone to the situational-awareness accessory or to an external support such as a tripod, hand-held microphone support, etc. In some implementations, the microphone can be used to issue voice commands to the situational-awareness accessory and/or a linked smart device to control operation/functionality.

Figure 13:
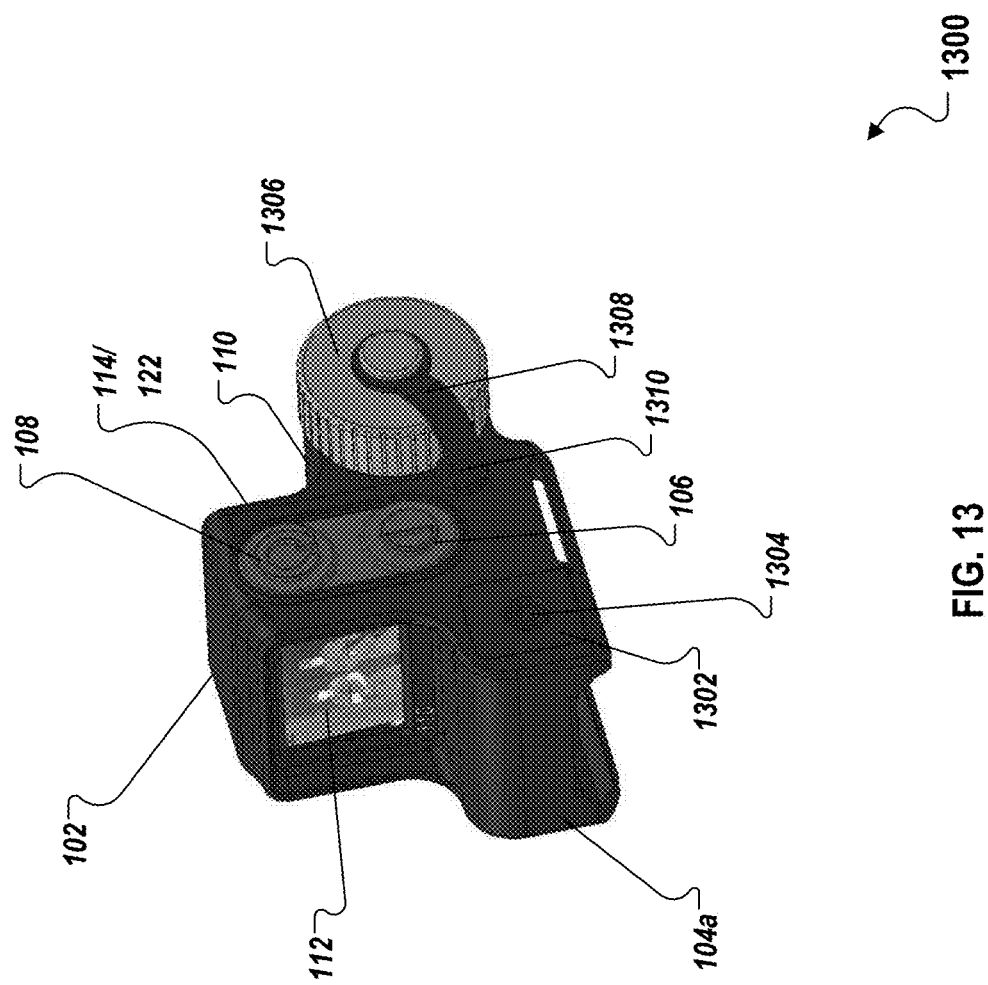
FIG. 13 illustrates a right-side perspective view of an alternative situational-awareness accessory for use with optical devices, according to an implementation.

Turning to FIG. 13, FIG. 13 illustrates a right-side perspective view of an alternative situational-awareness accessory for use with optical devices according to an implementation. As illustrated in FIG. 13, the situational-awareness accessory is of a simpler design and lacks the more complicated accessory rail mounting system (104a-104c) as described above. Instead, a rail clamp 1302 (similar to rail clamp 104d) is used with a locking screw 1304 to secure the situational-awareness accessory to an accessory rail. As illustrated, the locking screw has an Allen head-type engagement interface, but the type of locking screw and interface can vary (e.g., Phillips head, slot head, TORX head, thumb screw, etc.). Also, the removable battery-compartment cap 1306, battery-compartment cap retainer 1308, and battery-compartment cap retainer anchor 1310 are of a different design than that illustrated in FIGS. 1-8. Other design changes consistent with the disclosure are not meant to be limiting to the described subject matter and are considered to be within the scope of the disclosure.

Figure 2:
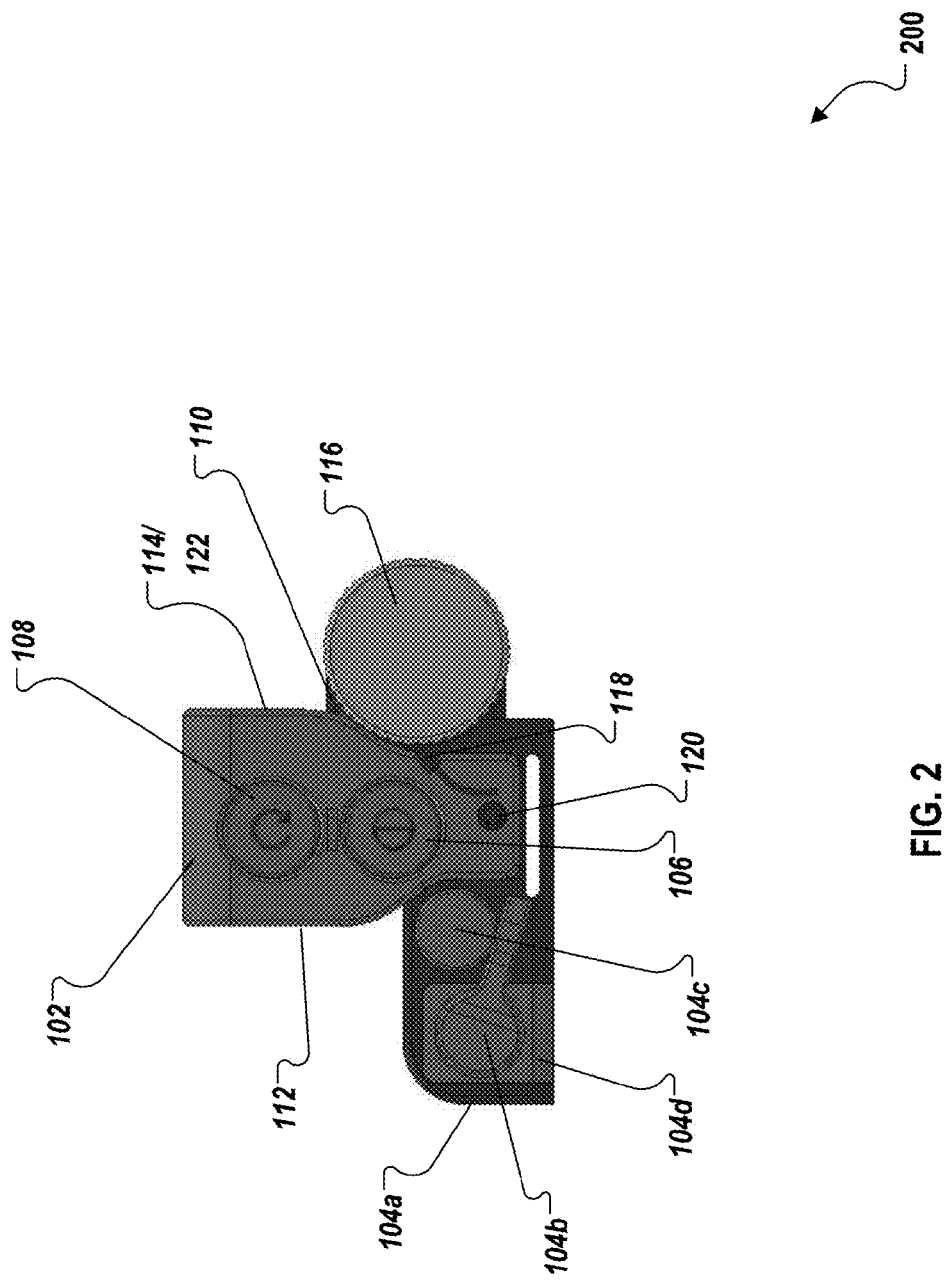
FIG. 2 illustrates a right-side view of the situational-awareness accessory for use with optical devices, according to an implementation.

FIG. 2 illustrates a right-side view 200 of the situational-awareness accessory for use with optical devices, according to an implementation.

Figure 3:
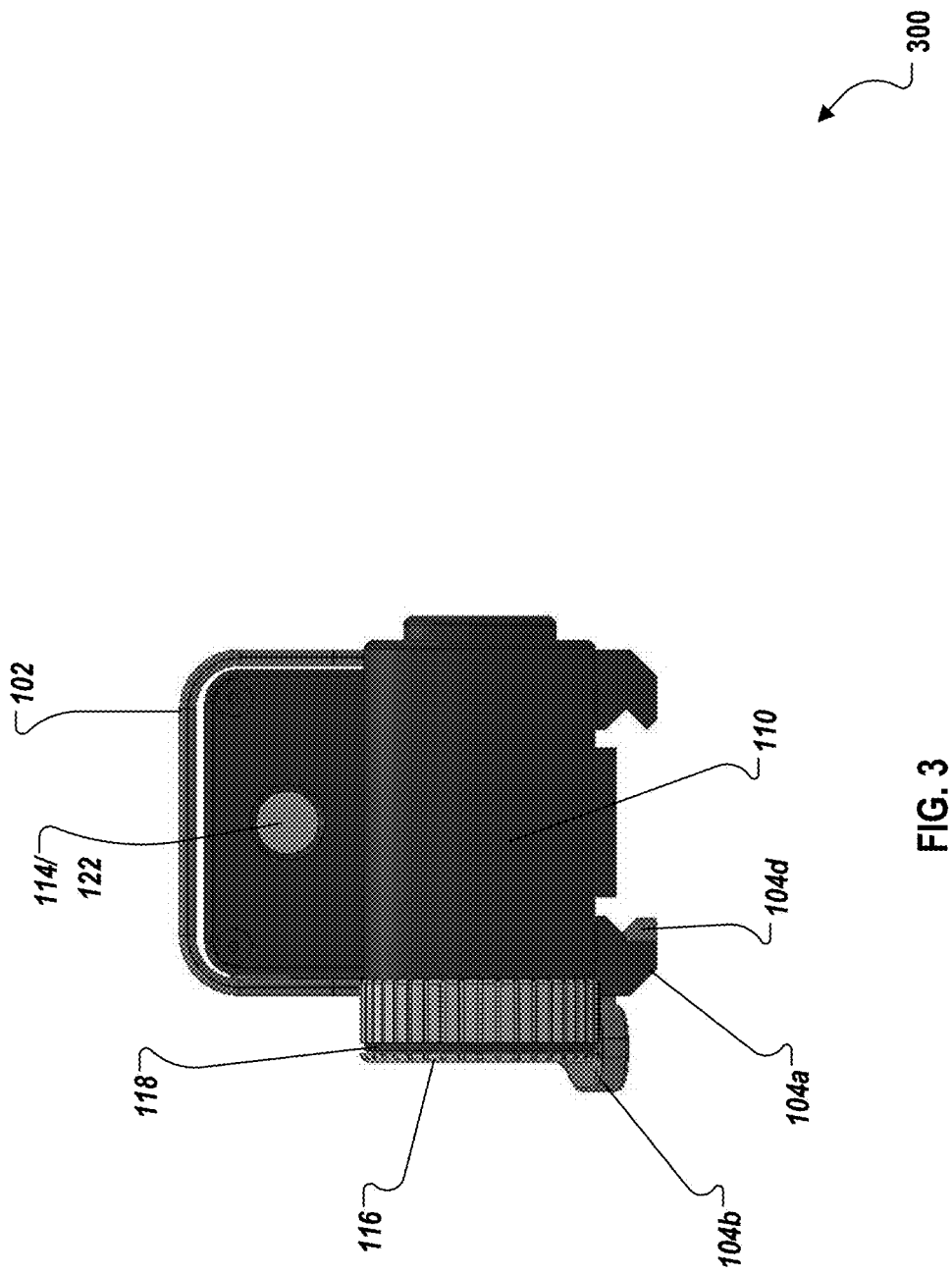
FIG. 3 illustrates a front view of the situational-awareness accessory for use with optical devices, according to an implementation.

FIG. 3 illustrates a front view 300 of the situational-awareness accessory for use with optical devices, according to an implementation. Note that 114/122 can illustrate either an integral lens of the visual sensor 114 or a separate objective lens/cover 122 in front of the visual sensor 114.

Figure 4:
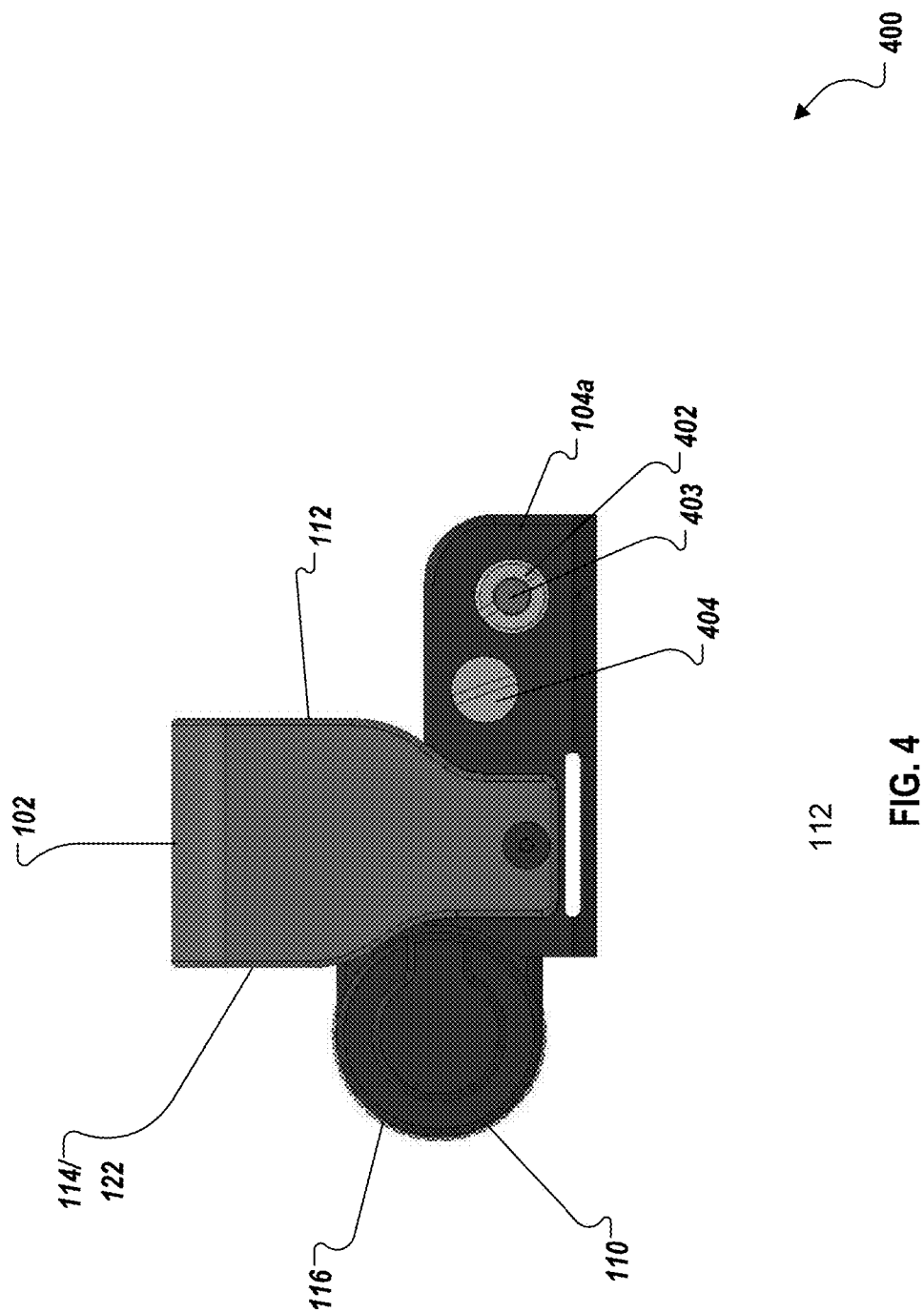
FIG. 4 illustrates a left-side view of the situational-awareness accessory for use with optical devices, according to an implementation.

FIG. 4 illustrates a left-side view 400 of the situational-awareness accessory for use with optical devices, according to an implementation. Preload screw 402 is threaded around pivot shaft 403. The pivot shaft 403 is coupled to the mounting arm 104b and allows for adjustment of the clamping force of the rail clamp 104d on an accessory rail. Interlock set screw 404 is used to adjust the extension of the interlock 104c outward from the body 104a. The interlock 104c is used to prohibit the backwards motion of the mounting arm when rotate to a particular configuration.

Figure 5:
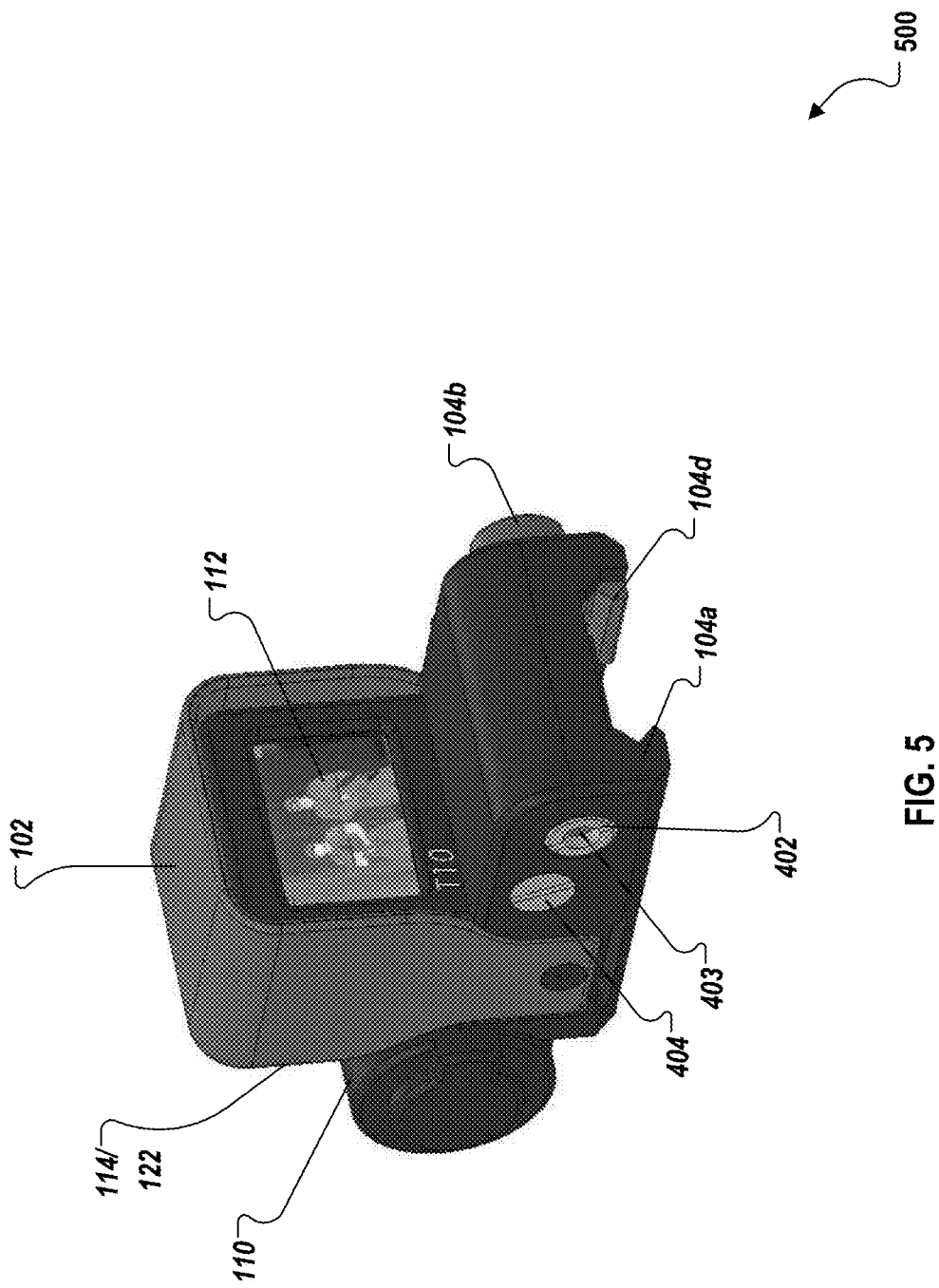
FIG. 5 illustrates a left-side perspective view of the situational-awareness accessory for use with optical devices, according to an implementation.

FIG. 5 illustrates a left-side perspective view 500 of the situational-awareness accessory for use with optical devices, according to an implementation.

Figure 6:
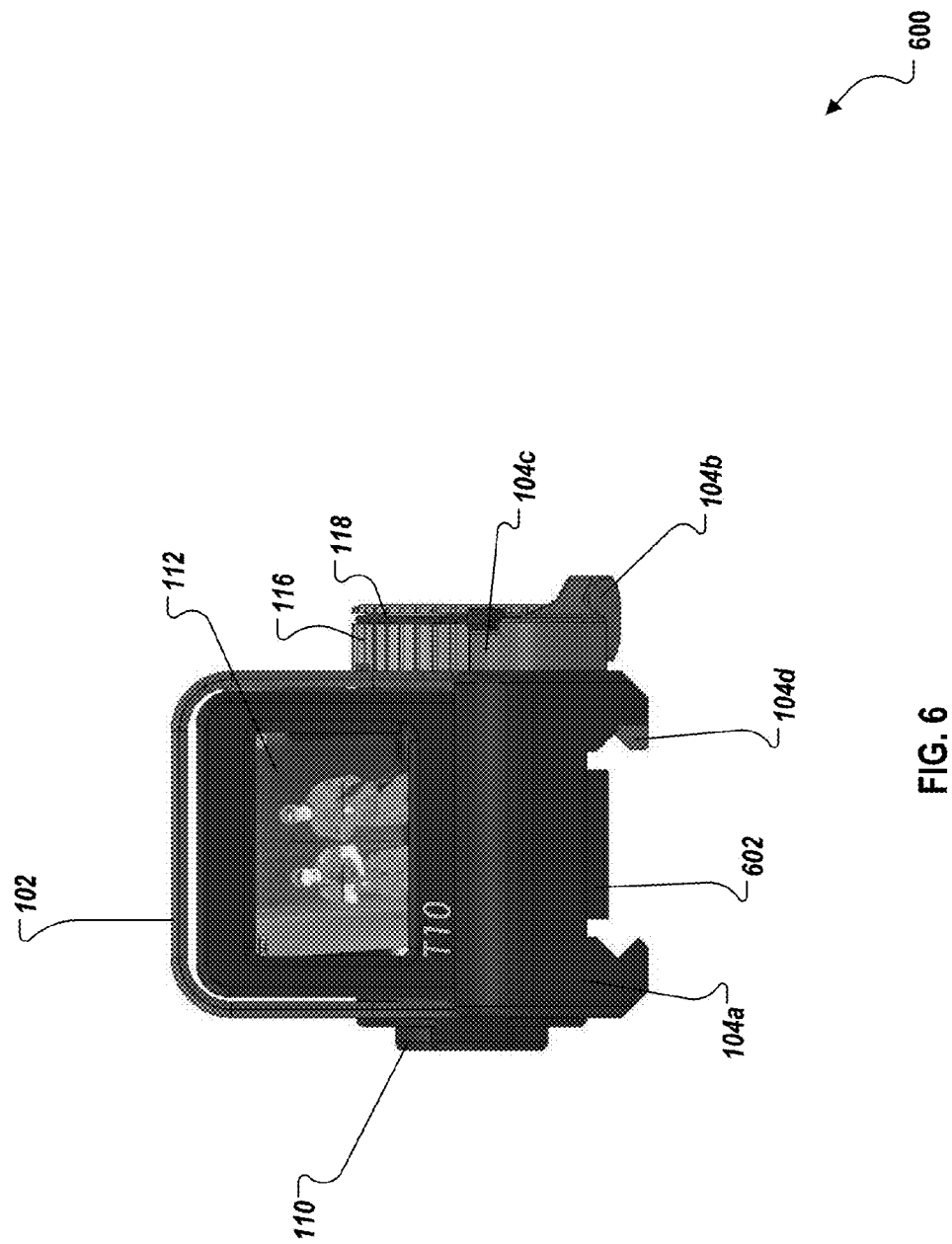
FIG. 6 illustrates a rear view of the situational-awareness accessory for use with optical devices, according to an implementation.

FIG. 6 illustrates a rear view 600 of the situational-awareness accessory for use with optical devices, according to an implementation. Slot engagement bar 602 is integrally formed from the body 104a into a rectangular shape of a size to engage with a slot formed into a rail. When engaged with a rail slot, the slot engagement bar 602 prevents lateral movement of the situational-awareness accessory on the rail along an axis transverse to the slot. In other implementations, the slot engagement bar 602 can be a separately formed component that is attached to the situational-awareness accessory body 104a, for example, by pinning, welding, adhesive, or the like. In other implementations, the slot engagement bar 602 can be omitted from the situational-awareness accessory body 104a.

Figure 7:
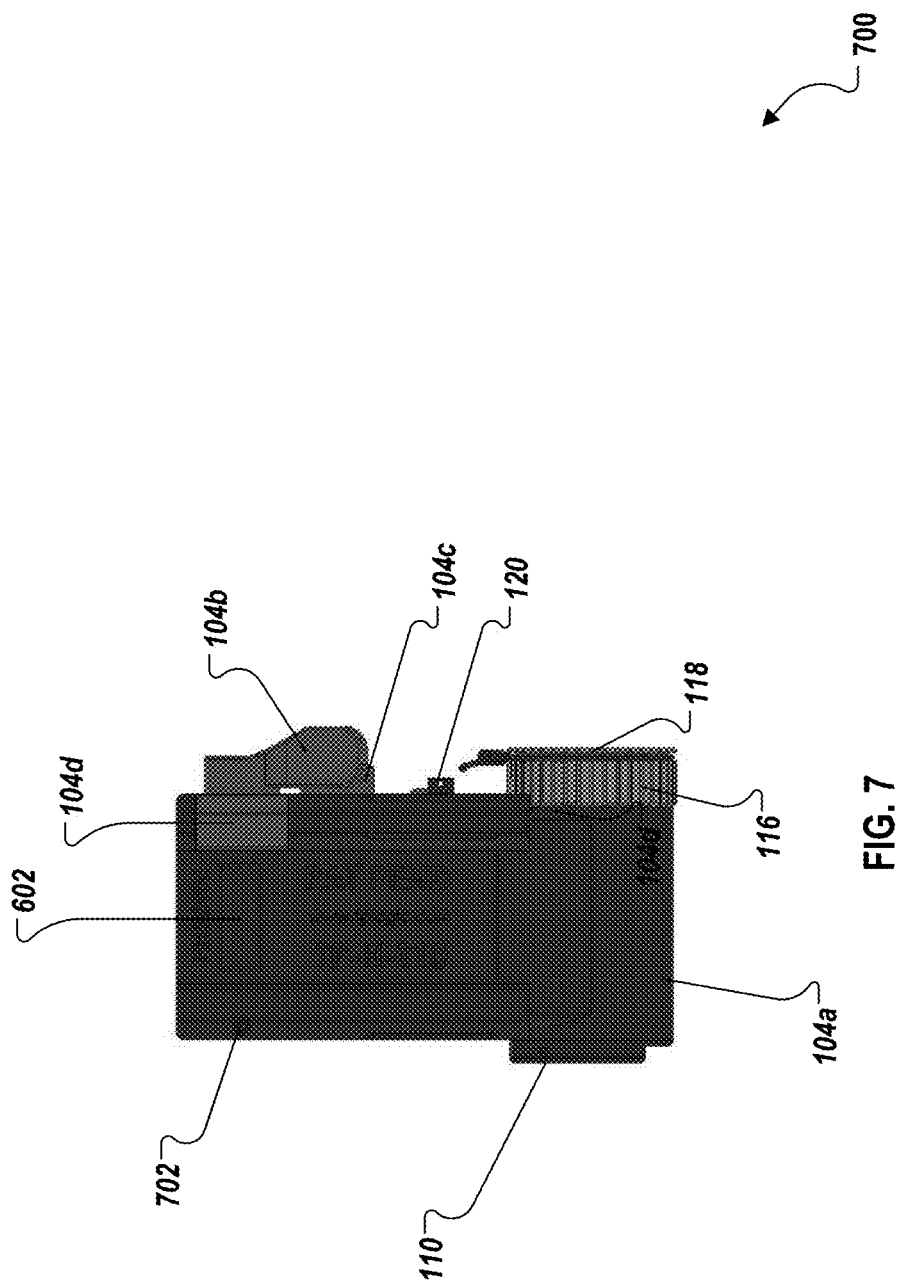
FIG. 7 illustrates a bottom view of situational-awareness accessory for use with optical devices, according to an implementation.

FIG. 7 illustrates a bottom view 700 of the situational-awareness accessory for use with optical devices, according to an implementation. Preload grub screw hole 702 receives the a preload grub screw and is configured to allow the preload grub screw to physically rotate between an engaged position, for example, screwed further into the body 104a, contacting the preload screw 402, and an unengaged position, for example, screwed outward toward the surface of the body 104a. When the preload grub screw is in the engaged position, friction and/or mechanical contact between the preload grub screw and the preload screw 402 prevents the preload screw 402 from rotating to adjust the clamping force of the rail clamp 104d on an accessory rail. When the preload grub screw is in the unengaged position, the preload screw 402 can be rotated.

Figure 8:
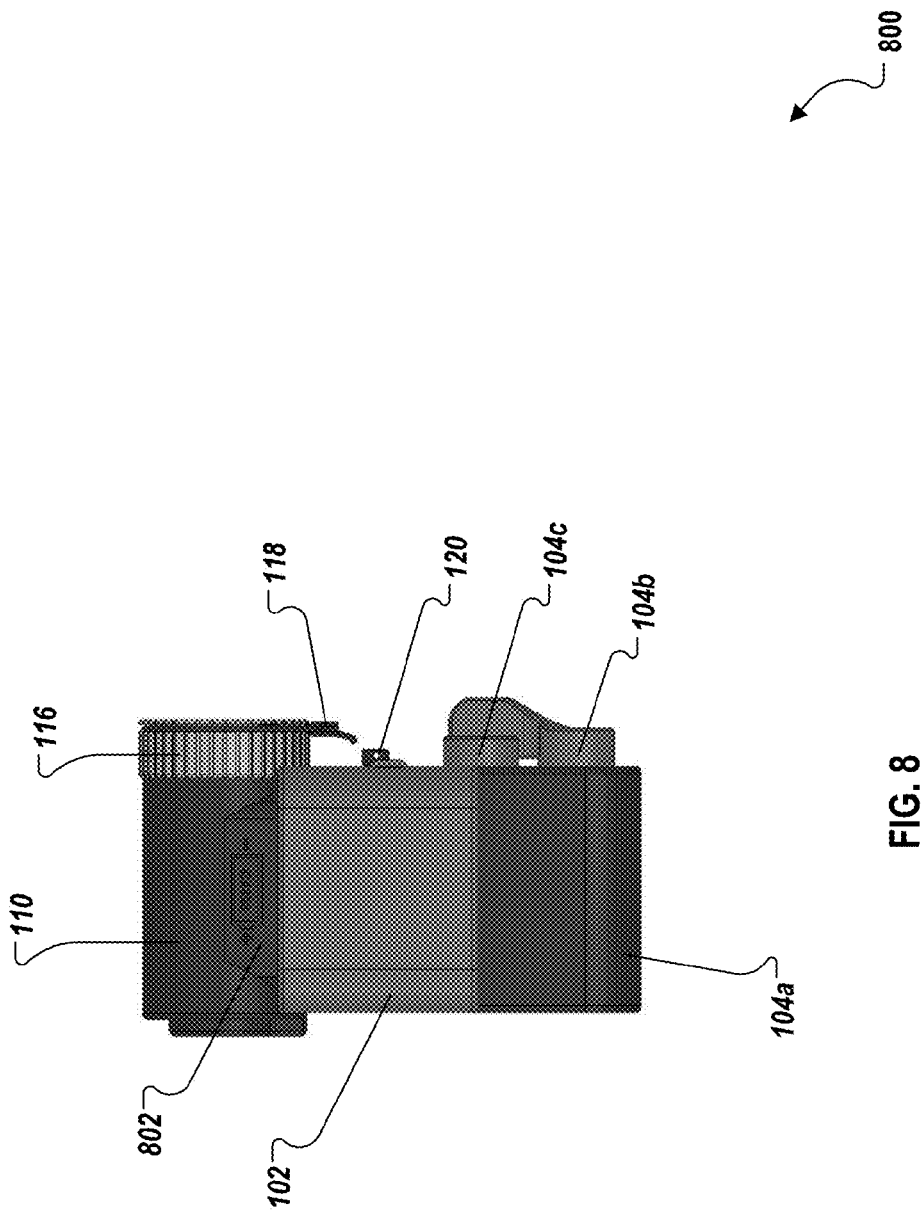
FIG. 8 illustrates a top view of the situational-awareness accessory for use with optical devices, according to an implementation.

FIG. 8 illustrates a top view 800 of the situational-awareness accessory for use with optical devices, according to an implementation. In some implementations, the top of the battery compartment 110 can be marked with a directional indicator for proper insertion of a battery.

Figure 9:
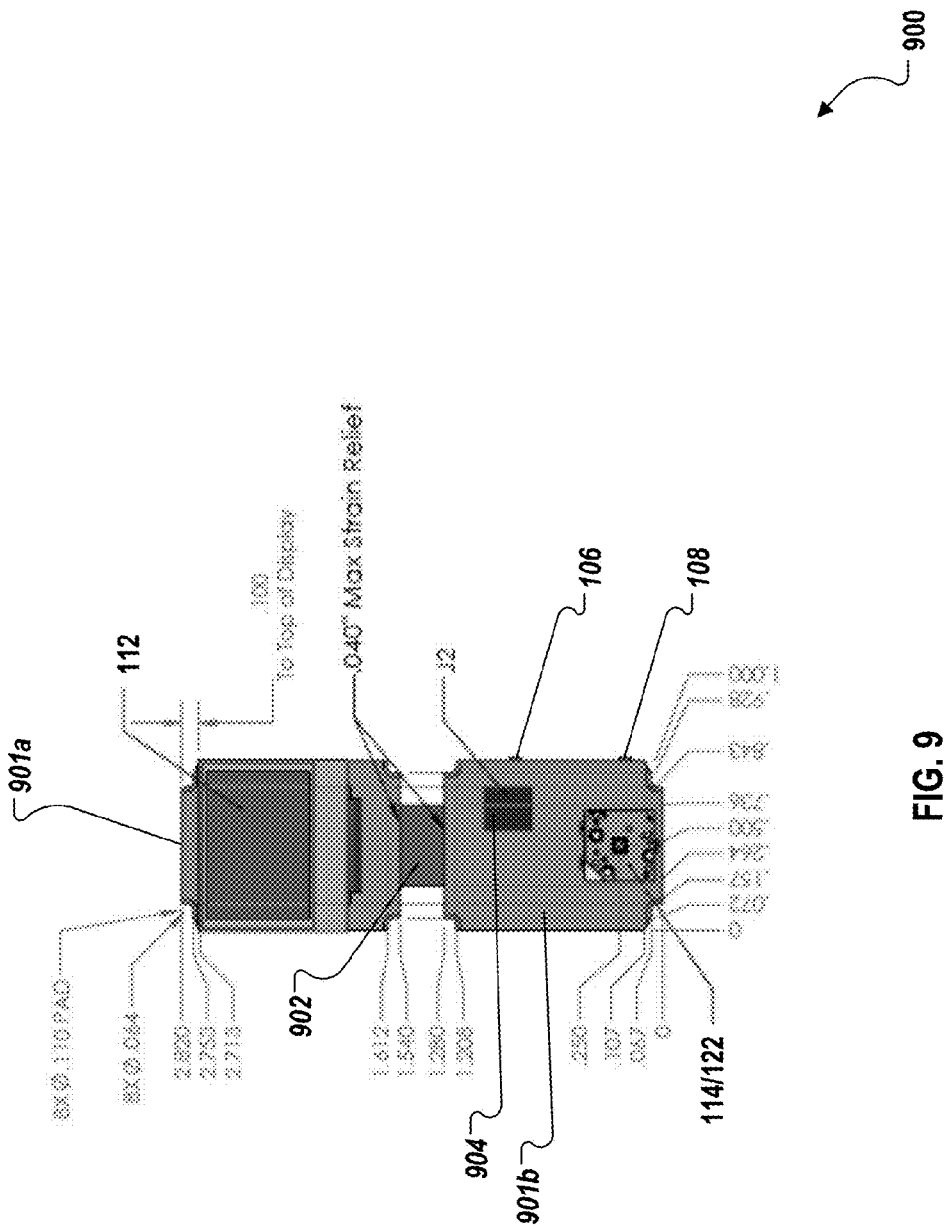
FIG. 9 illustrates a front view of an internal control board for the situational-awareness accessory for use with optical devices, according to an implementation.

FIG. 9 illustrates a front view 900a of an internal control board for the situational-awareness accessory for use with optical devices, according to an implementation. Note that shown measurements, dimensions, and strain values are for a specific implementation(s) of the situational-awareness accessory and are not meant to be limiting to all possible implementations of the situational-awareness accessory. The internal control board includes a first control board 901a and a second control board 901b joined by a flexible data connection 902 (e.g., a ribbon cable). In typical implementations, the first control board 901a and the second control board 901b are folded "back-to-back" and placed into the situational-awareness accessory housing 102. As illustrated in FIG. 9, in typical implementations, the user display 112 is situated on the first control board 901a, and the visual sensor 114/objective lens 122 is situated on the second control board 901b. Also typically situated on the second control board 901b are the power button 108, the adjustment button 106, and power management 904 (J2). Power management 904 provides power management functions related to the battery (and in some implementations, recharging capability of the battery is rechargeable).

Although not illustrated, in some implementations, the internal control board can also be configured with connectors providing connection functionality as described above. For example, the internal control board could be configured with a USB port connector, an audio connector/built-in microphone/microphone jack, etc.

Figure 10:
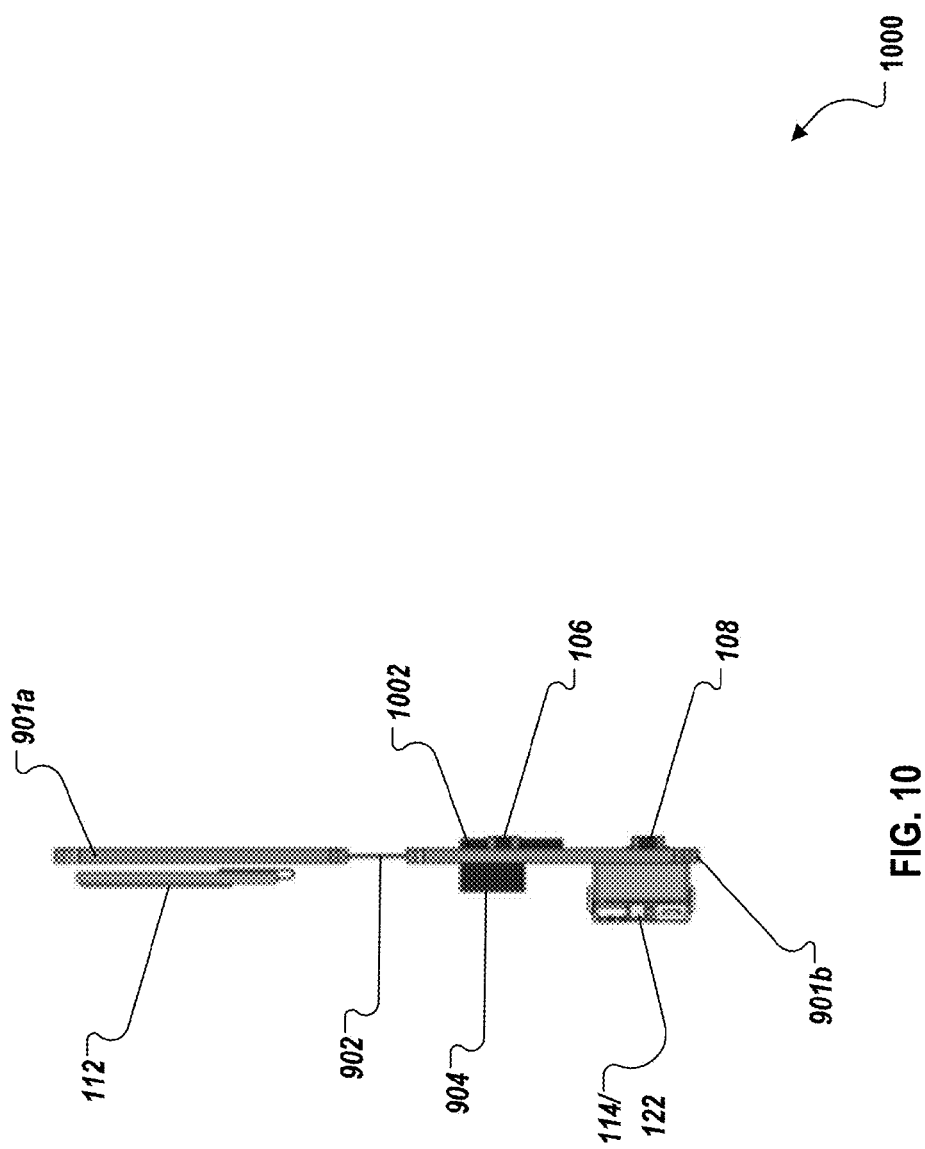
FIG. 10 illustrates a side view of the internal control board for the situational-awareness accessory for use with optical devices, according to an implementation.

FIG. 10 illustrates a side view of the internal control board for the situational-awareness accessory for use with optical devices, according to an implementation. Also illustrated in FIG. 2 is microprocessor 1002 (U8) providing overall processing functionality for the situational-awareness accessory.

Figure 11:
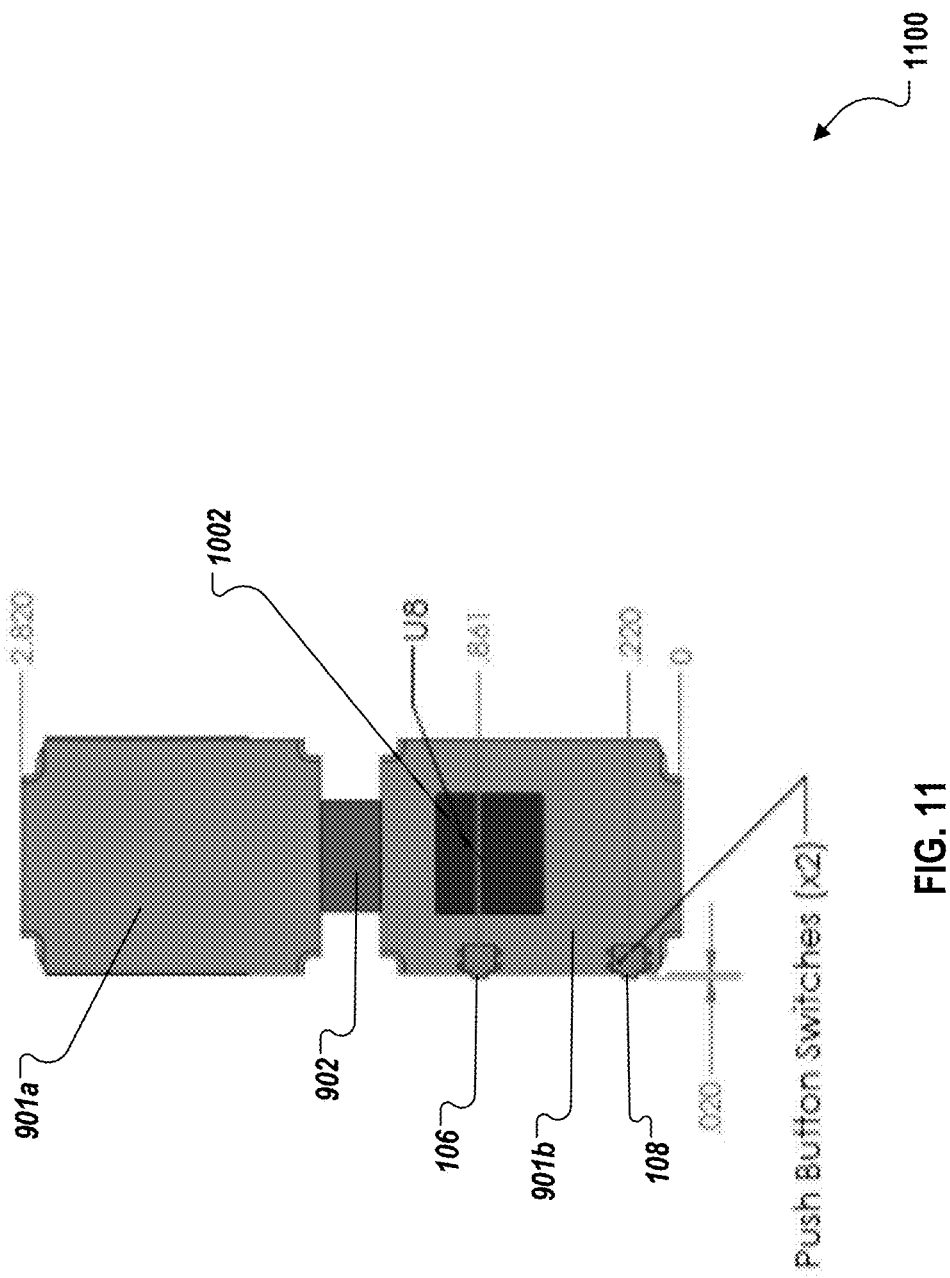
FIG. 11 illustrates a rear view of the internal control board for the situational-awareness accessory for use with optical devices, according to an implementation.

FIG. 11 illustrates a rear view of the internal control board for the situational-awareness accessory for use with optical devices, according to an implementation.

Figure 12:
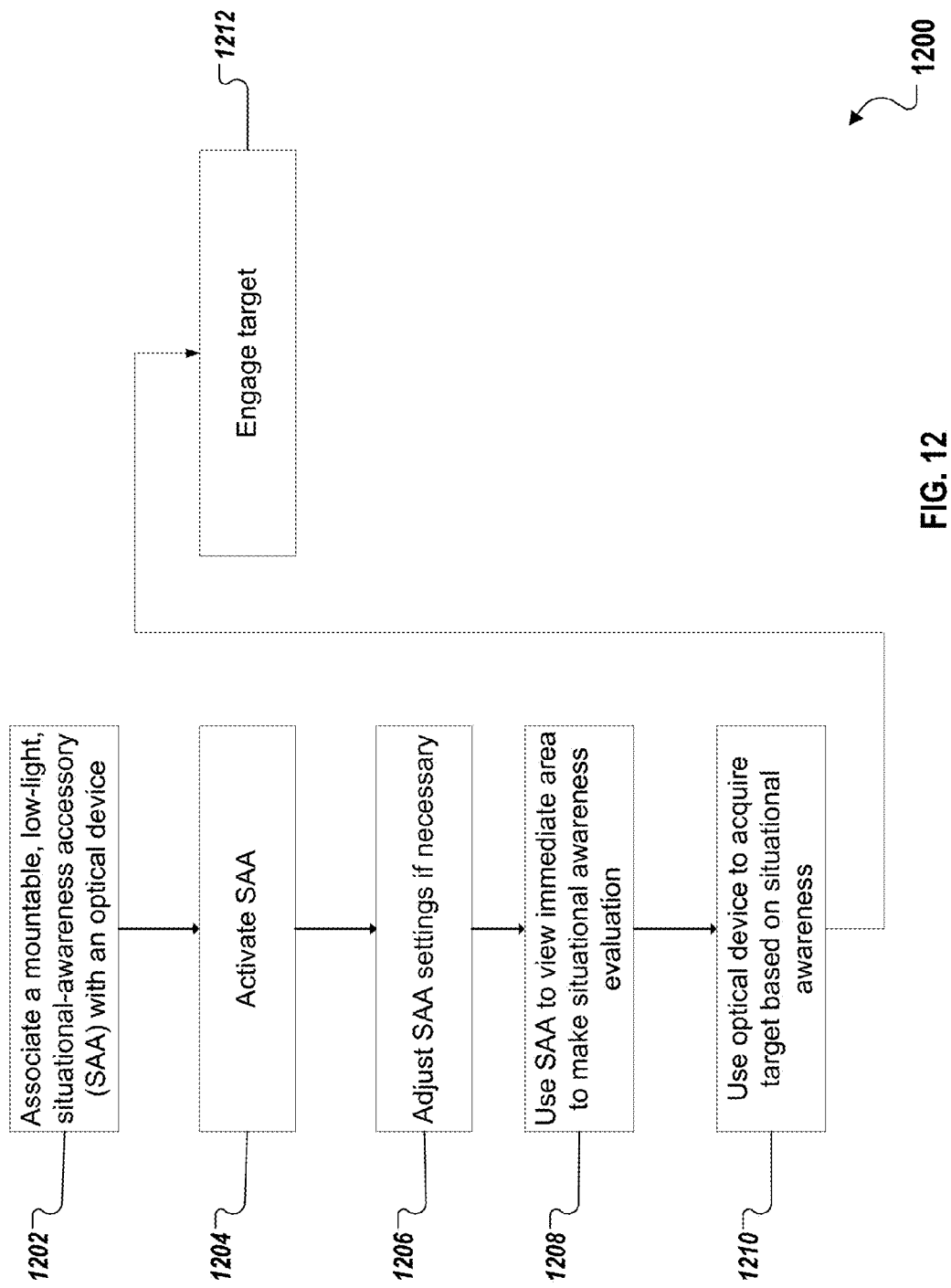
FIG. 12 is a flow chart of a method of use of the situational-awareness accessory for use with optical devices, according to an implementation.

FIG. 12 is a flow chart of a method of use 1200 of the situational-awareness accessory for use with optical devices, according to an implementation. For clarity of presentation, the description that follows generally describes method 1200 in the context of FIGS. 1-11. However, it will be understood that method 1200 may be performed, for example, by any other suitable system, environment, software, and hardware, or a combination of systems, environments, software, and hardware as appropriate. In some implementations, various steps of method 1200 can be run in parallel, in combination, in loops, or in any order.

At 1202, a situational-awareness accessory (situational-awareness accessory) is associated with an optical device (e.g., a night vision/daylight optical scope, telescope, etc.). Association means coupled with, attached to, zeroed with respect to, etc. (for example, attached to a firearm or to the top of a scope tube). From 1202, method 1200 proceeds to 1204.

At 1204, the situational-awareness accessory is activated using a power control mechanism. This can include powering on the situational-awareness accessory using a power button, triggering activation from an external control mechanism (e.g., an attached control device, smart device, etc.), activation due to an internal motion sensor detecting motion, etc. From 1204, method 1200 proceeds to 1206.

At 1206, settings for the situational-awareness accessory are adjusted using an adjustment mechanism based on the operating environment. For example, color and/or temperature settings can be made (e.g., black hot/white hot, temperature gradations, etc.), a reticle/aiming dot can be displayed, etc. From 1206, method 1200 proceeds to 1208.

At 1208, the situational-awareness accessory is used to view an immediate area to make a situational awareness evaluation (e.g., determining whether targets exist to engage, identifying targets, etc.). Note that additional settings adjustments may be made based on the situational awareness evaluation. From 1208, method 1200 proceeds to 1210.

At 1210, the associated optical device (or in some implementations, the situational-awareness accessory) is used to engage any necessary target(s). From 1210, method 1200 proceeds to 1212.

At 1212, the target is engaged as necessary. After 1212, method 1200 stops.

Note that in some implementations, a standard red-dot-type optic aiming mechanism for a firearm can be used in conjunction with the situational-awareness accessory to provide an aiming point when looking through the red-dot optic. For example, the red-dot optic could be zeroed with respect to the rifle and then the situational-awareness accessory placed in the optical path of the red-dot optic. A user of the situational-awareness accessory looking through the red-dot optic would see a red-dot projected against the situational-awareness accessory user display (e.g., user display 112) providing an aiming point for the user. Note that the use of the re-dot optic could also be used when the situational-awareness accessory displays an image from various wavelengths of light. For example, with the situational-awareness accessory in a thermal mode, the red-dot optic aiming point would be against a thermal image. If the situational-awareness accessory were operated in a visible light mode (basically passing through a visible light image of what is in front of it to display on the user display 112), the red-dot optic aiming point could still be used as an aiming point against the displayed, passed-through visible light image without having to remove the situational-awareness accessory from the firearm.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, e.g., a central processing unit (CPU), an FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example, LINUX, UNIX, WINDOWS, MAC OS, ANDROID, IOS, or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface including, but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language-independent or -dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking and parallel processing may be advantageous.

Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

What is claimed is:

1. A situational-awareness accessory, comprising:
a housing including a control board, a user display, and a visual sensor for receiving electromagnetic radiation that is invisible to the human eye from a wide-angle, optical field-of-view (FOV) in front of the visual sensor, wherein the
control board converts received electromagnetic radiation into visual display data and initiates display of the visual display data on the user display, and wherein the visual sensor is configured to be interchangeable within the housing; and
a quick-detach accessory base mount coupled with the housing and permitting attachment of the housing to an accessory rail, the quick-detach accessory base mount including:
a rail clamp carried to selectively clamp the base mount to the accessory rail;
a mounting arm coupled with a pivot shaft threaded to hold a preload screw opposite the mounting arm and the rail clamp, the mounting arm configured to rotate relative to the base mount between a clamped and an unclamped position associated with the rail clamp, the rotation of the mounting arm causing the rail clamp to clamp and unclamp the base mount to the accessory rail, respectively; and
an interlock configured to selectively restrict rotation of the mounting arm between the clamped and unclamped positions.

2. The situational-awareness accessory of claim 1, wherein electromagnetic radiation receivable by the visual sensor includes at least one of ultraviolet (UV), infrared (IR), or X-ray.

3. The situational-awareness accessory of claim 1, comprising an objective lens to provide at least one of protection or functionality enhancement to the visual sensor.

4. The situational-awareness accessory of claim 3, wherein the functionality enhancement includes one or more of providing a wider FOV, magnification, and filtering of one or more wavelengths of electromagnetic radiation.

5. The situational-awareness accessory of claim 1, comprising an aiming-type indicator displayed on the user display.

6. The situational-awareness accessory of claim 1, comprising optical or digital zoom functionality provided with the visual sensor to provide a zoomed image on the user display.

7. The situational-awareness accessory of claim 1, wherein the control board provides connectivity functionality with an external computing device.

8. The situational-awareness accessory of claim 7, wherein the external computing device can configure the situational-awareness accessory, record data received from the situational-awareness accessory, and supply data to the situational-awareness accessory for display on the user display.

9. The situational-awareness accessory of claim 1, wherein the control board comprises a first control board and a second control board joined by a flexible data connection and folded back-to-back within the housing.

10. A situational-awareness accessory, comprising:
a housing including a control board, a user display, and a visual sensor for receiving electromagnetic radiation that is invisible to the human eye from a wide-angle, optical field-of-view (FOV) in front of the visual sensor, wherein the
control board converts received electromagnetic radiation into visual display data and initiates display of the visual display data on the user display, and wherein the visual sensor is configured to be interchangeable within the housing; and;
a quick-detach accessory base mount coupled with the housing and permitting attachment of the housing to an accessory rail, the quick-detach accessory base mount including:
a rail clamp carried to selectively clamp the base mount to the accessory rail; and
a rotatable mounting arm coupled with a pivot shaft passing through the rail clamp, the pivot shaft threaded to hold a preload screw opposite the mounting arm and the rail clamp, the preload screw used to configure a clamping force of the rail clamp to the accessory rail, and the preload screw secured to the mounting arm in a particular position using a preload grub screw.

11. The situational-awareness accessory of claim 10, wherein electromagnetic radiation receivable by the visual sensor includes at least one of ultraviolet (UV), infrared (IR), or X-ray.

12. The situational-awareness accessory of claim 10, comprising optical or digital zoom functionality provided with the visual sensor to provide a zoomed image on the user display.

13. The situational-awareness accessory of claim 10, wherein the control board provides connectivity functionality with an external computing device, and wherein the external computing device can configure the situational-awareness accessory, record data received from the situational-awareness accessory, and supply data to the situational-awareness accessory for display on the user display.

14. The situational-awareness accessory of claim 10, wherein the control board comprises a first control board and a second control board joined by a flexible data connection and folded back-to-back within the housing.

15. A method comprising:
associating a situational-awareness accessory with an optical device, the situational-awareness accessory comprising a housing including a user display and a visual sensor, wherein the visual sensor is configured to be interchangeable within the housing;
activating the situational-awareness accessory to receive electromagnetic radiation that is invisible to the human eye from a wide-angle, optical field-of-view (FOV) in front of the visual sensor;
adjusting settings for the situational-awareness accessory on the user display;
viewing the user display of the situational-awareness accessory to make a situational awareness evaluation of an immediate area in front of the situational-awareness accessory, the user display displaying the received electromagnetic radiation converted into visual display data; and
using the optical device to engage a target based on the situational awareness evaluation.

16. The method of claim 15, wherein associating the situational-awareness accessory with the optical device includes use of a quick-detach accessory base mount configured as part of the situational-awareness accessory, the quick-detach accessory base mount including:

a rail clamp carried to selectively clamp the base mount to the accessory rail;

a mounting arm coupled with a pivot shaft threaded to hold a preload screw opposite the mounting arm and the rail clamp, the mounting arm configured to rotate relative to the base mount between a clamped and an unclamped position associated with the rail clamp, the rotation of the mounting arm causing the rail clamp to clamp and unclamp the base mount to the accessory rail, respectively; and an interlock configured to selectively restrict rotation of the mounting arm between the clamped and an unclamped position.

17. The method of claim 15, comprising interchanging the visual sensor in the situational-awareness accessory depending upon which wavelength of electromagnetic radiation desired to be used to make the situational awareness evaluation.

18. The method of claim 15, comprising connecting the situational-awareness accessory to an external computing device, wherein the external computing device can be used to configure the situational-awareness accessory, record data received from the situational-awareness accessory, and to supply data to the situational-awareness accessory for display on the user display.

* * * * *